United States Patent [19]

Cole

[11] 4,251,717
[45] Feb. 17, 1981

[54] HEATING CIRCUITS

[75] Inventor: Graham M. Cole, Lymington, England

[73] Assignee: Dreamland Electrical Appliances Limited, Southampton, England

[21] Appl. No.: 945,067

[22] Filed: Sep. 20, 1978

[30] Foreign Application Priority Data

Oct. 11, 1977 [GB] United Kingdom ............... 42295/77

[51] Int. Cl.³ .......................... H05B 1/02; H05B 1/00
[52] U.S. Cl. .................................. 219/497; 219/505; 219/508; 219/511; 219/510; 219/212
[58] Field of Search ............... 219/497, 499, 504, 212, 219/505, 485, 511, 507, 508, 501, 510; 323/22 SC; 307/310

[56] References Cited

U.S. PATENT DOCUMENTS

| | | | |
|---|---|---|---|
| 2,568,700 | 9/1951 | Armstrong | 219/485 |
| 3,375,477 | 3/1968 | Kawazoe | 219/505 |
| 3,462,585 | 8/1969 | Somers | 219/505 |
| 3,493,727 | 2/1970 | Hosokawa et al. | 219/505 |
| 3,549,865 | 12/1970 | Melling | 219/505 |
| 3,564,203 | 2/1971 | Naoi | 219/501 |
| 3,789,190 | 1/1974 | Orosy et al. | 219/501 |
| 3,943,326 | 3/1976 | Henry | 219/505 |
| 4,031,352 | 6/1977 | Oosterberg | 219/505 |
| 4,038,519 | 7/1977 | Foucras | 219/505 |

Primary Examiner—B. A. Reynolds
Assistant Examiner—Mark H. Paschall
Attorney, Agent, or Firm—Mason, Fenwick & Lawrence

[57] ABSTRACT

A heating circuit, in particular for an electric blanket or pad, comprises an elongate heating conductor and switch connected in series between input terminals for connection to an AC supply. Switch control is operative to close the switch to cause current to flow through the heating conductor. The circuit further comprises a sensor conductor coextensive with the heating conductor, and a temperature sensitive resistance coextensive with the heating and sensor conductors and having an impedance that falls with increasing temperature. A resistor is connected in series with the sensor conductor such that a current dependent on the impedance of the temperature sensitive resistance flows through the resistor, whereby the voltage across the resistor varies with said impedance. Voltage sensing structure is responsive to the voltage across the resistor reaching a predetermined value to inhibit operation of the switch control, thereby to provide normal and/or overtemperature control. Further, circuit interruption structure is responsive to excessive heating of the resistor to prevent current flow through the heating conductor, thereby to provide back-up overtemperature control.

11 Claims, 3 Drawing Figures

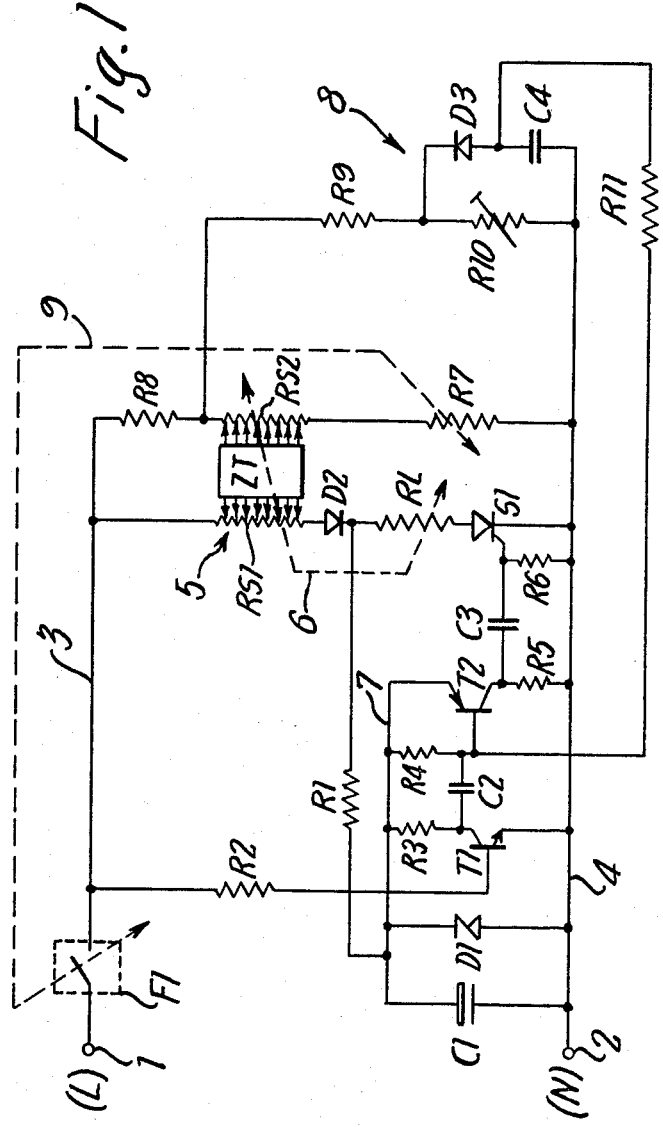

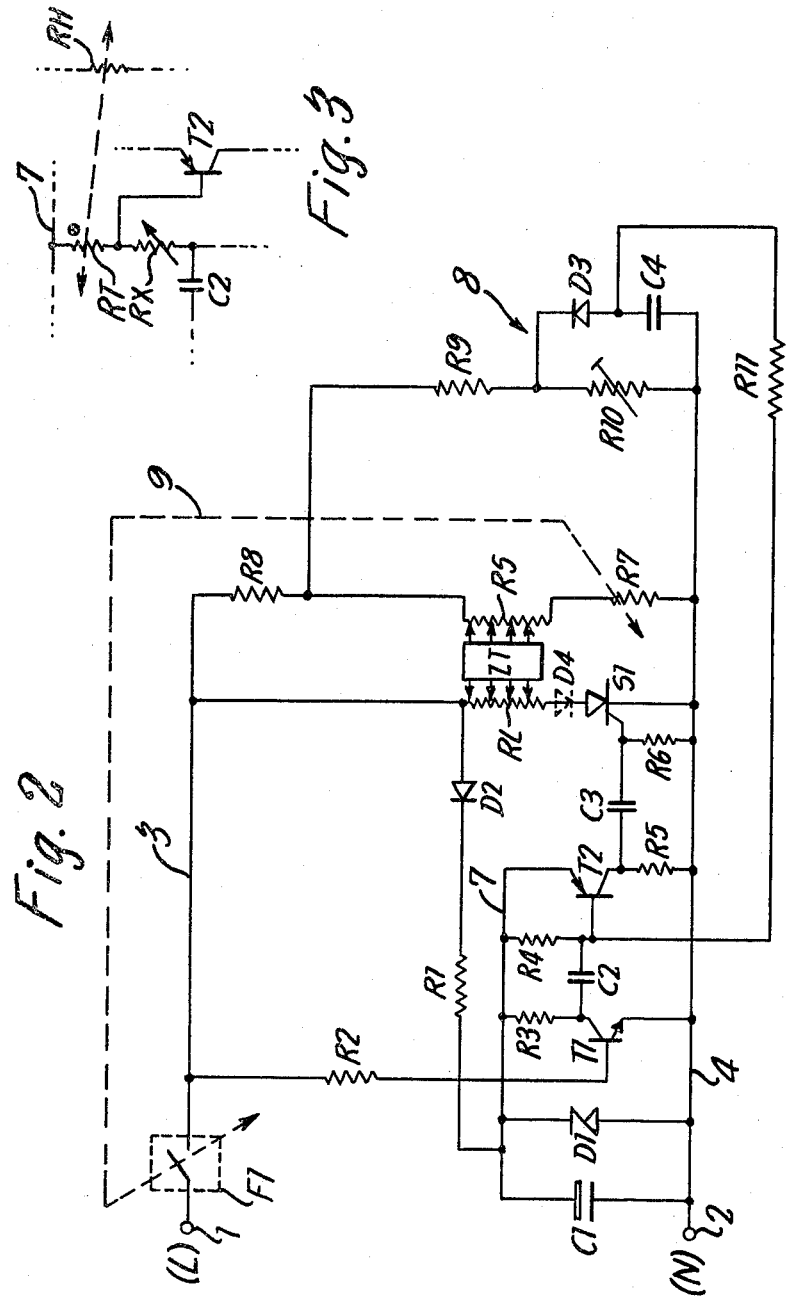

HEATING CIRCUITS

BACKGROUND OF THE INVENTION

1. Field of the Invention

This invention relates to heating circuits which are particularly, but not exclusively, suitable for heating electric blankets and pads.

2. Description of the Prior Art

U.S. Pat. No. 3,461,585 discloses a heating circuit that comprises input terminals for connection to an AC supply, an elongate heating conductor and switch means connected in series between the input terminals, switch control means operative to close the switch means to cause current to flow through the heating conductor, a sensor conductor substantially coextensive with the heating conductor, and temperature sensitive means coextensive with the heating and sensor conductors and having an impedance that falls with increasing temperature.

In the known heating circuit, normal temperature control (i.e. control of the heat output under normal conditions) is provided by a thermistor responsive to ambient temperature to cause the switch control means to vary the firing angle of the switch means, which is a thyristor. Normal temperature control thus does not take account of the temperature of the temperature sensitive means. Overtemperature control, i.e. the prevention of current flow through the heating conductor in the event of overheating, is obtained by virtue of the impedance of the temperature sensitive means being connected in parallel with means for applying pulses to the thyristor to prevent the application of pulses to the thyristor when the impedance falls due to overheating. A disadvantage of this overtemperature control arrangement is that it is not very fail-safe. For instance, should the circuit go into a failure mode in which the switch means becomes permanently closed, current will continue to flow through the heating conductor, leading to a severe risk of damage, fire and personal injury. This risk is particularly severe when the heating circuit is embodied in an electric blanket or pad, in that the heating conductor is close to the body of the user and/or to a bed, whereby in the worst case the user could be seriously injured or even killed by fire or electrocution.

SUMMARY OF THE INVENTION

An object of the invention is to provide a heating circuit of the type set forth above which is highly fail-safe as regards prevention of heating current flowing through the heating conductor in the event of overheating.

This object is achieved, according to the invention, in that the heating circuit comprises a resistor connected in series with the sensor conductor such that, in use, a current dependent on the impedance of the temperature sensitive means flows through the resistor whereby the voltage across the resistor varies with said impedance, voltage sensing means responsive to the voltage across said resistor reaching a predetermined value to inhibit operation of the switch control means, and circuit interruption means responsive to excessive heating of said resistor to prevent current flow through the heating conductor.

When the heating circuit is switched on the temperature of the temperature sensitive means rises, due to heating by the heating conductor, whereby the impedance of the temperature sensitive means drops. When said impedance reaches a value corresponding to a normal operating temperature, the voltage sensing means detects that the voltage across said resistor has reached said predetermined value and inhibits closure of the switch means by the switch control means. The temperature sensitive means then cools and the impedance of the temperature sensitive means increases till the voltage across said resistor drops to below the predetermined value whereby the voltage sensitive means enables closure of the switch means by the switch control means. In this way, the voltage sensing means enables the switch means to be operative to close the switch means from time to time to maintain the normal operating temperature. In other words, the voltage sensing means can provide normal temperature control, which control takes account of the temperature of the temperature sensitive means.

The voltage sensing means can instead or also provide overtemperature control in that should the temperature sensitive means become over-heated along its length, or should it become locally overheated at some point along its length due, for example, to a ruck in the heating conductor or an arc across a break therein, the voltage sensing means will be responsive to the consequent increase in voltage across the resistor due to the general or localised drop in impedance of the temperature sensitive means to inhibit operation of the switch control means whereby the switch means remains open.

The circuit interruption means provides back-up overtemperature control in that should the switch means remain closed in the event of an overtemperature, for instance due to failure of the voltage sensitive means, failure of the switch control means in a manner to keep the switch means closed or a short-circuiting of the impedance of the temperature sensitive means due to an arc burn, the circuit interruption means will stop current flowing through the heating conductor.

According to one embodiment of the invention the temperature sensitive means separates the elongate heating conductor and the sensor conductor. In this embodiment, a second resistor is connected in series with the sensor conductor and the first-mentioned resistor and the series circuit thereby formed is connected in parallel with the series combination of the heating conductor and the switch means, whereby should a break occur in the sensor conductor the voltage across said series combination will be applied to the voltage sensitive means via the second resistor to cause the voltage sensitive means to inhibit operation of the switch control means whereby current cannot flow through the heating conductor.

According to another embodiment, the heating circuit further comprises another sensor conductor, the temperature sensitive means separating the two sensor conductors. The other sensor conductor is preferably arranged in series with the heating conductor and the switch means, whereby should a break occur in said other sensor conductor current cannot flow through the heating conductor. Preferably, a second resistor is connected in series with the first-mentioned sensor conductor and the first-mentioned resistor and the series circuit thereby formed is connected in parallel with the series combination of said other sensor conductor, the heating conductor and the switch means, whereby should a break occur in the first-mentioned sensor conductor the voltage across said series combination will be applied to the voltage sensing means via the second resistor to cause the voltage sensing means to inhibit operation of the switch control means whereby current cannot flow through the heating conductor.

The switch means preferably comprises an electronic unidirectionally conducting device and the switch control means is operative to cause the device to conduct throughout half-cycles of the AC supply of one polarity, whereby during the half-cycles of the AC supply of the other polarity the device does not conduct, and the voltage sensing means is operative to monitor the voltage across said resistor during said half-cycles of said other polarity. Such an arrangement has the advantage that the reliable detection of general or localised overheating, particularly the latter, is facilitated. In the event of a localised overheat resulting in a localised reduction in the impedance of the temperature sensitive means, the potential on the side of the locally reduced impedance remote from the said resistor is the same during the alternate half-cycles of said other polarity regardless of the location of the overheat, due to the fact that during these half-cycles there is no current flow through the heating conductor, whereby the voltage across said resistor is independent of the location of the overheat. In the absence of such an arrangement, for example if, while switched on, the switch means conducted during all or part of every half-cycle, it would be much more difficult to detect a localised overheat in certain positions since, due to the voltage gradient along the conductor (the heating conductor or the other sensor conductor) separated from the sensor conductor by the temperature sensitive means, the effect of a localised overheat would vary with its position.

Preferably, the switch means comprises an electronic device requiring to be triggered into conduction, and the switch control means comprises first means to provide a DC voltage that changes in level when, in use, the AC supply crosses zero, second means to differentiate said level change to produce a voltage spike, and third means to apply said spike to the switch means as a triggering pulse whereby the switch means is triggered to conduct substantially as the AC supply crosses zero. This arrangement ensures that the switch means is reliably triggered into conduction as the AC supply crosses zero. Further, it ensures that subsequent inhibit of the switch control means in the event of the normal temperature or an over-temperature being attained does not cause "click" interference since the switch means is only triggered into the on state for a very short duration (e.g. approximately 50 to 100 microseconds) at the commencement of each alternate half-cycles. Also, as explained in more detail below, this feature makes it very difficult to strike an arc across any break that might be present in the heating conductor.

The switch means may be of any suitable type, preferably solid-state. In preferred embodiments of the invention described below it is a thyristor.

Heating circuits in accordance with the invention are applicable to the heating of a variety of objects or media. They may be used, for example, in pipe heating, soil warming, industrial process heating or in space heating, for instance in ceiling heating or under floor heating. The invention is, however, especially suited to the heating of an electric blanket, which term is to be deemed to encompass not only electrically heated overblankets but also electrically heated underblankets, and electrically heated pads.

BRIEF DESCRIPTION OF THE DRAWINGS

The invention will now be further described, by way of example, with reference to the accompanying drawings, in which:

FIG. 1 is a circuit diagram of a first heating circuit in accordance with the invention and particularly designed for heating an electrically heated underblanket or an electrically heated pad;

FIG. 2 is a circuit diagram of a second heating circuit in accordance with the invention, the circuit of FIG. 2 being a modification of that of FIG. 1; and FIG. 3 is a circuit diagram of a modification that can be made to either of the circuits shown in FIGS. 1 and 2 to provide ambient responsive control.

DETAILED DESCRIPTION OF THE PREFERRED EMBODIMENTS

The heating control circuit shown in FIG. 1 comprises a pair of input terminals 1, 2 for connection to the live (L) and neutral (N) conductors of an AC mains supply (not shown). Connected to the terminals 1, 2 respectively are live and neutral "rails" 3 and 4, respectively. A thermal fuse F1 is connected in series with the live rail 3 adjacent the live input terminal 1. As is known to those skilled in the art, the thermal fuse F1 is a non-resettable thermal link and comprises a current carrying device (generally incorporating a low melting point alloy) responsive to the application of external heat to non-resettably stop the passage of current therethrough.

The illustrated circuit incorporates a sensor wire shown generally at 5. The sensor wire 5 comprises two conductors represented by resistors RS1 and RS2, the two conductors being separated or spaced apart along their entire lengths by a layer of a material having an impedance which decreases with temperature. The material is represented in the drawing by a distributed impedance ZT. The material may be polyvinyl chloride (PVC) which may or may not be doped or loaded with a substance that enhances its conductivity.

Compound heating cables employing layers of temperature-sensitive impedance material and heating and sensor conductors are well known per se in the electric blanket art. For example, a cable comprising a heating conductor and sensor conductor separated by such a material is disclosed in UK Pat. No. 804 086.

The heating circuit shown in FIG. 1 further comprises an elongate heating conductor or heating element schematically represented as a resistor RL. The heating conductor RL may be laid out on the blanket or pad in known manner to provide heating thereof. The heating conductor RL is substantially co-extensive with the sensor wire 5 whereby heating of the heating conductor will cause the impedance ZT to decrease. The heating conductor RL and sensor wire 5 may be manufactured separately and may be interleaved or run together in the blanket or pad, or the heating conductor and sensor wire may be constructed as separate parts of an integral heater/sensor cable. The effective thermal connection between the heating conductor RL and the sensor wire 5, whether these two items are separate or integral, is represented in the drawing by a dotted line 6.

It should be noted that whereas the conductors of the sensor wire 5 are represented by resistors RS1 and RS2, the resistances of the two conductors are in fact very low and can for present purposes be ignored.

The sensor conductor RS1, a diode D2, the heating conductor RL and a thyristor S1 are connected in series, in that order, between the live rail 3 and neutral rail 4. A resistor R8, the sensor conductor RS2 and a resistor R7 are connected in series in that order between the live rail 3 and neutral rail 4, whereby the series circuit thereby formed is in parallel with the series combination of the sensor conductor RS1, the diode D2, the heating conductor RL and the thyristor S1.

The diode D2, a resistor R1, a smoothing capacitor C1 and a Zener diode D1 cooperate to form a DC power supply circuit. In use, the diode D2 rectifies positive half-cycles of the supply voltage to establish a DC voltage which is clamped by the Zener diode D1 to establish a voltage of +8 V on a +8 V supply rail 7.

Resistors R2, R3, R4, R5 and R6, capacitors C2 and C3, and transistors T1 and T2, connected as shown in the drawing, cooperate to form a zero crossing trigger pulse generator for generating trigger pulses to fire the thyristor S1 to cause current to flow from the mains, during positive half-cycles thereof, through the heating conductor RL.

The resistors R7 and R8, a resistor R9 and a preset variable resistor R10 connected in series across the series combination of the sensor conductor RS2 and the resistor R7, a diode D3, a capacitor C4 and a resistor R11, all connected as shown in the drawing, constitute a temperature control circuit, the functioning of which is explained below.

The operation of the heating circuit shown in FIG. 1 will now be described. When the mains supply is connected to the input terminals 1 and 2, the +8 V DC supply is generated by the power supply circuit and applied to the +8 V rail 7. Assuming the sensor wire 5 to have been cold before the supply was switched on, the impedance ZT will be at a relatively high value (e.g. 1 M or so), depending upon its temperature. The impedance ZT and the resistor R7 thus constitute a potential divider connected between the live and neutral rails 3 and 4. (The effect of the resistor R8, which is effectively in parallel with the impedance ZT, can be ignored in this respect since it is substantially higher than the impedance ZT.) Accordingly, a proportion of the mains voltage is developed across the sensor conductor RS2 and R7, this voltage being tapped down further by the resistive divider constituted by the resistors R9 and R10. The diode D3 rectifies the tapped down voltage during negative half-cycles of the AC supply and builds up a charge on the capacitor C4 which is applied via the resistor R11 to the base of the transistor T2. This voltage normally holds the transistor T2 off. The components R9, R10, D3, C4 and R11 thus act as a voltage sensing means 8 to detect the voltage across the resistor R7 during negative half-cycles of the AC supply, bearing in mind that the voltage across the sensor conductor RS2 can be ignored in view of its low resistance relative to that of the resistor R7.

Consider now what happens when the mains voltage rises through zero. As the mains voltage rises to approximately +1 V, the transistor T1 is switched on via the resistor R2. The DC voltage level on the collector of the transistor T1 therefore drops towards the potential of the neutral rail 4. The capacitor C2 and resistor R4 act as a differentiator to translate the abrupt lowering of the potential on the collector of the transistor T1 into a negative spike (i.e. a short-duration pulse) which is applied to the base of the transistor T2. The transistor T2 is thus switched on causing a positive pulse to be developed across the resistor R5. This pulse is coupled via the capacitor C3 to the gate of the thyristor S1 and to the resistor R6, whereby the thyristor is triggered on. The thyristor S1 is thus triggered on by a short-duration pulse (e.g. 50 to 100 microseconds) substantially as the mains rises upwardly through zero and the thyristor continues to conduct throughout the entire following positive half-cycle of the mains until conduction is prevented by the thyristor being reverse biassed at the start of the following negative mains half-cycle.

While the heating conductor RL warms up, the above process continues. Namely, the transistor T1 generates a square wave, which is differentiated to form a series of spikes which are inverted by the transistor T2 and passed as a series of short-duration firing pulses to the thyristor S1 each time the AC supply voltage rises through zero, whereby the thyristor S1 is caused to conduct throughout the entirety of each successive positive half-cycle of the mains voltage to cause current to flow through the heating conductor RL.

As the impedance ZT drops in value due to heating of the material represented thereby by virtue of the current flowing through the heating conductor RL, the voltage across the resistor R7 increases. So also, naturally, does the voltage applied to the base of the transistor T2. Eventually, when a normal operating temperature (at which the impedance ZT is, for example, about 10 K or so) is reached, as determined by the precise setting of the preset variable resistor R10, the voltage applied to the base of the transistor T2 is sufficient to switch it on whereby pulses can no longer be supplied to the thyristor S1. Accordingly, for the time being current can no longer flow through the heating conductor RL, whereby the material represented by the impedance ZT starts to cool down. The material represented by the impedance ZT thus cools and the impedance ZT increases until the voltage applied to the transistor T2 drops to a value at which the transistor T2 is no longer thereby switched on. Accordingly, pulses can thereafter be transmitted to the thyristor S1 to turn it on again whereby heating is resumed. Thus, as will by now be appreciated, heating is interrupted from time to time to maintain the desired normal operating temperature. In short, the voltage sensing means 8 constituted by the resistors R9 and R10, the diode D3, the capacitor C4 and the resistor R11 operates to provide what can be called normal temperature control.

If, for some reason, the material represented by the impedance should become overheated, that is to say heated to a temperature substantially above a desired operating temperature, it will be apparent that the voltage sensitive means 8 will inhibit the supply of pulses to the thyristor S1. Further, should localised heating occur at some position along the length of the sensor wire 5, for instance due to a ruck in the sensor wire or an arc across a break in the heating conductor RL, the impedance ZT will locally drop substantially due to the localised overheating whereby, once more, the voltage sensitive means 8 will inhibit the supply of pulses to the thyristor S1. In other words, as well as providing normal temperature control, the voltage sensitive means 8 provides overtemperature control responsive either to general or localised overheating of the sensor wire 5.

The above-described circuit facilitates detection of both general and localised overheating, particularly the latter. As mentioned above, the voltage sensing means 8 is operative to monitor the voltage across the resistor R7 during negative half-cycles of the AC supply. During such half-cycles there is, of course, no current flow through the thyristor S1, whereby there is no voltage gradient along the sensor conductor RS1 in series with the thyristor S1. Consequently, in the event of a localised reduction of the impedance ZT due to localised overheating somewhere along its length, the voltage sensed by the voltage sensing means 8 will not vary in accordance with the position of the overheat, which it would do if there were a voltage gradient along the sensor conductor RS1 due to current flowing through it.

The resistor R7, as well as performing the circuit function explained above, is thermally connected to the thermal fuse F1, as represented by a dotted line 9, whereby should the dissipation in the resistor R7 substantially exceed its normal value, the thermal fuse F1 will be blown and will break the live rail 3 to prevent current flowing through the heating conductor RL. The thermal fuse F1 thus provides a backup protection against overheating. Suppose, for example, the thyristor S1 fails short circuit or that due to a failure of the trigger pulse generator or voltage sensitive means 8 the thyristor S1, while not failing, continues to be supplied with trigger pulses after the desired temperature has been attained. The impedance ZT preferably falls logarithmically with temperature, whereby for an approximate 25° C. increase in temperature the impedance falls by a decade. An increase in element temperature of around 25° C. will thus cause a resultant power dissipation in the resistor R7 to increase ten-fold. The values of R7, R9 and R10 are chosen such that an increase in temperature of the heating conductor RL of around 25° C. above the normal operating value heats the resistor R7 sufficiently to cause the thermal fuse F1 to blow to isolate the heating circuit from the mains supply.

The diode D2, as well as acting as part of the +8 V internal DC power supply, is in series with the sensor conductor RS1 and the thyristor S1 and protects the thyristor to some extent against transients. It will be noted that due to the presence of the diode D2, even should the thyristor S1 fail short-circuit or continue to be triggered when it should not be, it is only the positive half-cycles of the mains that will flow through the heating conductor RL. If the diode D2 fails short-circuit, then no internal DC voltage is generated whereby, once more, current will stop flowing through the heating conductor RL. In the unlikely event of both the diode D2 and the thyristor S1 failing short-circuit, in which case the full mains power (positive and negative half-cycles) would flow through the heating conductor RL, current would stop flowing through the heating conductor RL by virtue of blowing of the thermal fuse F1 by the resultant heating of the resistor R7.

The circuit is also fail safe against an open circuit of either of the sensor conductors RS1 and RS2. If the conductor RS1 fails open circuit, that is to say a break develops therein, current obviously can no longer flow through the heating conductor RL, by virtue of the fact that the sensor conductor RS1 is in series with the heating conductor RL. If a break occurs in the sensor conductor RS2, the following happens. As mentioned above, the resistor R8 is normally in shunt with the impedance ZT and, in normal operation, has no effect on the operation of the circuit. However, if a break occurs in the sensor conductor RS2, the potential divider R9/R10 is connected to the live rail 3 by the resistor R8, the values of the three resistors being such that under all circumstances this will lead to a sufficient voltage being established across the potential divider R9/R10 to ensure that the voltage sensitive means operates to inhibit the supply of pulses to the thyristor S1.

The above-described techniques of zero-crossing triggering of the thyristor S1 by differentiating and inverting a square wave generated by amplifying the AC supply waveform by means of a transistor has several advantages. Firstly, it ensures that the thyristor S1 is reliably triggered into conduction as the AC supply rises through zero. Further, it ensures that a subsequent inhibition of its operation by the voltage sensing means 8, in the event of the latter detecting that the desired normal temperature or an overtemperature has been attained, causes no "click" interference, since the thyristor S1 is only triggered on for a very short period (approximately 50 to 100 microseconds) at the commencement of each positive half-cycle. Also, the triggering technique makes it almost impossible to strike an arc (which, of course, is dangerous) across a break in the heating conductor RL, since unless the conductor RL presents a continuous load to the thyristor S1 during the trigger pulse duration the thyristor will not latch on. An arc could only be established during a positive half-cycle after the thyristor S1 has already been triggered into conduction and is therefore unlikely to cause any damage because its maximum duration is limited to somewhat less than the duration of a half-cycle of the AC supply. However, even if the material having the impedance ZT were overheated or even charred, the thyristor S1 would be prevented from being triggered on again at the start of the next positive half-cycle, even if the ends of the break were to come together enabling the thyristor to latch on if it were to be supplied with a trigger pulse.

Suitable values for the components in the circuit diagram are given below, all capacitance values being in microfarads.

| R1 | 270K | R10 | 0 to 100 K |
|----|------|-----|------------|
| R3 | 100K | R11 | 1 M |
| R4 | 100K | | |
| R5 | 10K | | |
| R6 | 1K | C1 | 100 |
| R7 | 20K | C2 | 0.001 |
| R8 | 470K | C3 | 0.001 |
| R9 | 270K | C4 | 0.1 |

FIG. 2 shows a heating circuit which is very similar in construction and operation to that shown in FIG. 1 and which will therefore be described only in so far as it differs from the circuit of FIG. 1.

In the circuit of FIG. 2, instead of there being two sensor conductors, there is only a single sensor conductor, represented by a resistor RS, that corresponds in positioning and function to the sensor conductor RS2 in FIG. 1. The sensor conductor RS is separated or spaced apart from the heating conductor RL by the material (e.g. doped or undoped PVC) represented by the distributed impedance ZT. Preferably, the conductors RS and RL and the material represented by the impedance ZT constitute parts of a single dual-concentric electric heating element.

The position of the diode D2 has been changed in FIG. 2 to allow negative volts to appear across the heating conductor RL, that is to say to allow current to flow in the direction from the neutral to the live supply terminal via the resistor R7 and the impedance ZT during negative half-cycles of the supply voltage when the thyristor S1 does not conduct. The change of position of the diode D2 means that it no longer protects the thyristor S1 against transients, as it does in FIG. 1 as an additional function to its main function of rectifying the AC cupply voltage to provide an internal DC supply. However, if required, protection of the thyristor S1 against transients can be provided by positioning a further diode D4 (shown dotted) in series with and between the heating conductor RL and the thyristor S1, the diode D4 then taking over all the functions of the diode D2 in FIG. 1 except that of providing the internal DC supply.

It was explained above how the circuit of FIG. 1 is fail-safe against an open circuit of either of the sensor conductors RS1 and RS2. The circuit of FIG. 2 is fail-safe against failure of the sensor conductor RS in the same manner as the circuit of FIG. 1 is fail-safe against failure of the sensor conductor RS2.

The above-described facilitation of the detection of localised over-heating by monitoring the voltage across the resistor R7 during negative half-cycles of the AC supply is particularly important in the case of FIG. 2, since the voltage gradient during positive half-cycles across the heating conductor RL in FIG. 2 will be greater than that across the sensor conductor RS1 in FIG. 1, whereby, in the absence of this feature, the voltage sensed by the voltage sensing means 8 would vary much more in accordance with the position of the overheat.

For certain application, in addition to the normal temperature control provided in the circuits of FIGS. 1 and 2 by the resistor R7 and the voltage sensing means 8, it may be desirable to provide means allowing the heat output of the circuit to be controlled in accordance with a manual setting and/or in accordance with the ambient temperature.

FIG. 3 shows how either of the circuits of FIGS. 1 and 2 can be modified to provide both an ambient temperature responsive and a manually settable control. The resistor R4 is replaced by a thermistor RT and a variable resistor RX connected in series. The base of the transistor T2 is connected to the junction of the thermistor RT and the resistor RX. The thermistor RT is thermally coupled, as shown by a dotted line, to a resistor RH which is connected in series or in parallel with the heating conductor RL whereby the resistor RH is heated to an extent proportional to that to which the heating conductor RL is heated whereby the resistance of the thermistor RT is varied accordingly. The effect of ambient temperature on the resistor RH (and also on the thermistor RT) controls the switching points of the transistor T2 to provide ambient temperature responsive control. Manual alteration of the variable resistor RX enables the switching point of T2 to be controlled to provide manual temperature control.

I claim:

1. A heating circuit comprising input terminals for connection to an AC supply, an elongate heating conductor and switch means connected in series between the input terminals, said switch means being an electronic unidirectionally conducting switch means whereby upon closure of the switch means current will flow from the AC supply through the switch means and the heating conductor only during half-cycles of the AC supply of one polarity, switch control means operative to close the switch means to cause current to flow through the heating conductor, a sensor conductor substantially coextensive with the heating conductor, temperature sensitive means coextensive with the heating and sensor conductors and having an impedance that falls with increasing temperature, a resistor, means connecting said resistor in series with the sensor conductor and connecting said resistor and said impedance of the temperature sensitive means in series between said input terminals regardless of whether or not the switch means is conductive, whereby, in use, the AC supply voltage is applied across the series combination of said resistor and said impedance and a current dependent on the impedance of the temperature sensitive means flows from the AC supply through the resistor whereby the voltage across the resistor varies with said impedance and therefore with the temperature of the temperature sensitive means, voltage sensing means operative to monitor the voltage across said resistor during the half-cycles of the AC supply voltage of the other polarity and responsive to said voltage reaching a predetermined value to inhibit operation of the switch control means, and, in addition to said switch means, circuit interruption means disposed remote from the temperature sensitive means and electrically connected in series with the elongate conductor and the switch means, the circuit interruption means being responsive to excessive heating of said resistor due to a malfunction in the heating circuit enabling current to continue flowing through the heating conductor in the event of overheating of the temperature sensitive means to prevent current flow through the heating conductor and to continue prevention of such current flow even after the resistor has cooled.

2. A heating circuit according to claim 1, wherein the circuit interruption means comprises a thermal fuse which is thermally coupled to said resistor.

3. A heating circuit according to claim 1, wherein the temperature sensitive means separates the elongate heating conductor and the sensor conductor, said resistor is connected between one of said input terminals and one end of the sensor conductor, and the end of the heating conductor adjacent the other end of the sensor conductor is connected to the other input terminal.

4. A heating circuit according to claim 3, wherein a second resistor is connected in series with the sensor conductor and the first-mentioned resistor and the series circuit thereby formed is connected in parallel with the series combination of the heating conductor and the switch means, whereby should a break occur in the sensor conductor the voltage across said series combination will be applied to the voltage sensing means via the second resistor to cause the voltage sensing means to inhibit operation of the switch control means whereby current cannot flow through the heating conductor.

5. A heating circuit according to claim 1, which further comprises another sensor conductor, wherein the temperature sensitive means separates the two sensor conductors, said resistor is connected between one of said input terminals and one end of the firstmentioned sensor conductor, and the end of the other sensor conductor adjacent the other end of the first-mentioned sensor conductor is connected to the other input terminal.

6. A heating circuit according to claim 5, wherein the other sensor conductor is connected in series with the heating conductor and the switch means, whereby should a break occur in said other sensor conductor current cannot flow through the heating conductor.

7. A heating circuit according to claim 6, wherein a second resistor is connected in series with the first-mentioned sensor conductor and the first-mentioned resistor and the series circuit thereby formed is connected in parallel with the series combination of said other sensor conductor, the heating conductor and the switch means, whereby should a break occur in the first-mentioned sensor conductor the voltage across said series combination will be applied to the voltage sensing means via the second resistor to cause the voltage sensing means to inhibit operation of the switch control means whereby current cannot flow through the heating conductor.

8. A heating circuit according to claim 1, wherein the voltage sensing means comprises a potential divider connected in parallel with the sensor conductor and the said resistor, and a rectifier circuit connected across part of the potential divider to develop a DC voltage of which the magnitude is substantially proportional to the voltage across said resistor during said half-cycles of said other polarity.

9. A heating circuit according to claim 1, including ambient temperature responsive means operative on the switch control means to cause the latter to open or close the switch means in accordance with ambient temperature, and means enabling the heat output of the circuit to be manually controlled.

10. An electric blanket incorporating a heating circuit according to claim 1.

11. An electric pad incorporating a heating circuit according to claim 1.

* * * * *